United States Patent
Mikels et al.

(10) Patent No.: US 7,938,222 B2
(45) Date of Patent: May 10, 2011

(54) INDEPENDENTLY SUSPENDED AND DRIVEN ASYMMETRIC AXLE SHAFTS

(75) Inventors: David W. Mikels, Northville, MI (US); Young-Jin Seo, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/147,544

(22) Filed: Jun. 27, 2008

(65) Prior Publication Data

US 2009/0159359 A1 Jun. 25, 2009

Related U.S. Application Data (60) Provisional application No. 61/014,783, filed on Dec. 19, 2007.

(51) Int. Cl.
*B60B 35/14* (2006.01)
(52) U.S. Cl. .......... 180/381; 180/376; 180/905; 301/126
(58) Field of Classification Search .................. 180/381, 180/379, 376, 905; 301/128, 126, 124.1
See application file for complete search history.

(56) References Cited

U.S. PATENT DOCUMENTS

| | | | | |
|---|---|---|---|---|
| 1,789,242 | A * | 1/1931 | Marsh | 180/266 |
| 3,170,534 | A | 2/1965 | Kelley et al. | |
| 3,379,268 | A | 4/1968 | Enke | |
| 4,153,131 | A * | 5/1979 | Sakata et al. | 180/254 |
| 4,240,517 | A * | 12/1980 | Harlow et al. | 180/295 |
| 4,334,696 | A | 6/1982 | Bergstrom | |
| 4,413,701 | A * | 11/1983 | Kumagai | 180/256 |
| 4,432,428 | A | 2/1984 | Kondo et al. | |
| 4,436,175 | A * | 3/1984 | Watanabe et al. | 180/254 |
| 4,483,408 | A | 11/1984 | Yazaki | |
| 4,560,027 | A | 12/1985 | Murakami et al. | |
| 4,771,842 | A * | 9/1988 | Mishio et al. | 180/376 |
| 4,819,756 | A | 4/1989 | Krude | |
| 5,161,638 | A | 11/1992 | Hirano | |
| 5,188,194 | A * | 2/1993 | Gasch | 180/248 |
| 6,085,858 | A | 7/2000 | Wakana et al. | |
| 6,209,676 | B1 | 4/2001 | Jones et al. | |
| 6,398,686 | B1 * | 6/2002 | Irwin | 475/150 |
| 6,439,588 | B1 | 8/2002 | Svensson | |
| 6,729,455 | B2 * | 5/2004 | Hirota et al. | 192/35 |
| 7,111,705 | B2 | 9/2006 | Ohta et al. | |

(Continued)

OTHER PUBLICATIONS

Press Release of 2009 Cadillac CTS-V by General Motors Corporation, Detroit, MI (dated Jan. 14, 2008, first released on Jan. 8, 2008).

(Continued)

*Primary Examiner* — Ruth Ilan
*Assistant Examiner* — Keith Frisby (57) ABSTRACT

An independently suspended, driven axle shaft set in which the axle shafts are asymmetric with respect to each other, wherein the asymmetry provides mitigation of powerhop. The asymmetric axle shafts are asymmetrically selected such that the relative torsional stiffness therebetween is different by a ratio substantially between about 1.4 to 1 and about 2.0 to 1. The asymmetry may be provided by any known modality that alters torsional stiffness and is compliant with operational load demands of the axle shafts, as for example the axle shafts having the same length, but differing cross-sectional diameters; or by the axle shafts having the same cross-sectional diameters, but differing lengths; or a combination thereof.

3 Claims, 5 Drawing Sheets

U.S. PATENT DOCUMENTS

| | | |
|---|---|---|
| 7,264,079 B2 | 9/2007 | Bordini |
| 7,588,117 B2 | 9/2009 | Fukuda |
| 7,628,457 B2 | 12/2009 | Pochatila et al. |
| 2002/0128117 A1 | 9/2002 | Schroder et al. |
| 2005/0045411 A1 | 3/2005 | Knapke et al. |
| 2006/0017256 A1 | 1/2006 | Hupperich, Jr. |
| 2006/0027992 A1 | 2/2006 | Bordini |
| 2007/0114080 A1* | 5/2007 | Kaiser et al. ............ 180/65.1 |
| 2009/0160152 A1 | 6/2009 | Mikels et al. |
| 2009/0178875 A1 | 7/2009 | Bowers |
| 2009/0194963 A1 | 8/2009 | Tomlin et al. |
| 2009/0229908 A1 | 9/2009 | Ito |

OTHER PUBLICATIONS

Press Release of 2009 Corvette ZR1 by General Motors Corporation, Detroit, MI (dated Dec. 20, 2007).

"Stability Analysis of Solid Axle, Torque Arm Suspension Vehicles under Heavy Acceleration and Braking Events" by Young-Jin Seo, Kenneth L. Oblizajek and Steven P. Fuja, presented at the SAE 2008 World Congress, Detroit, MI (presented on Apr. 15, 2008, submitted to SAE for approval on Dec. 26, 2007).

David W. Mikels, et al., U.S. Appl. No. 12/147,561, filed Jun. 27, 2008 entitled "Rearward Torque Arm for Damping Independently Suspended and Driven Axle Shafts," assigned to GM Global Technology Operations, Inc.

* cited by examiner

Fig. 12

US 7,938,222 B2

INDEPENDENTLY SUSPENDED AND DRIVEN ASYMMETRIC AXLE SHAFTS

CROSS-REFERENCE TO RELATED APPLICATIONS

The present patent application claims the benefit of provisional patent application Ser. No. 61/014,783, filed on Dec. 19, 2007, which provisional patent application is presently pending.

TECHNICAL FIELD

The present invention relates generally to driven axle shafts of motor vehicles, and more particularly to a damped axle shaft set in which the axle shafts are asymmetric with respect to each other, whereby the asymmetry provides mitigation of powerhop.

BACKGROUND OF THE INVENTION

Motor vehicles with driven axle independent suspensions include a pair of axle shafts (also referred to as split axles or half shafts), one for each wheel, as described, merely by way of exemplification, in U.S. Pat. No. 4,699,235 issued on Oct. 13, 1987 to Anderson and assigned to the assignee of the present patent application, the disclosure of which is hereby incorporated herein by reference.

Figure 1:
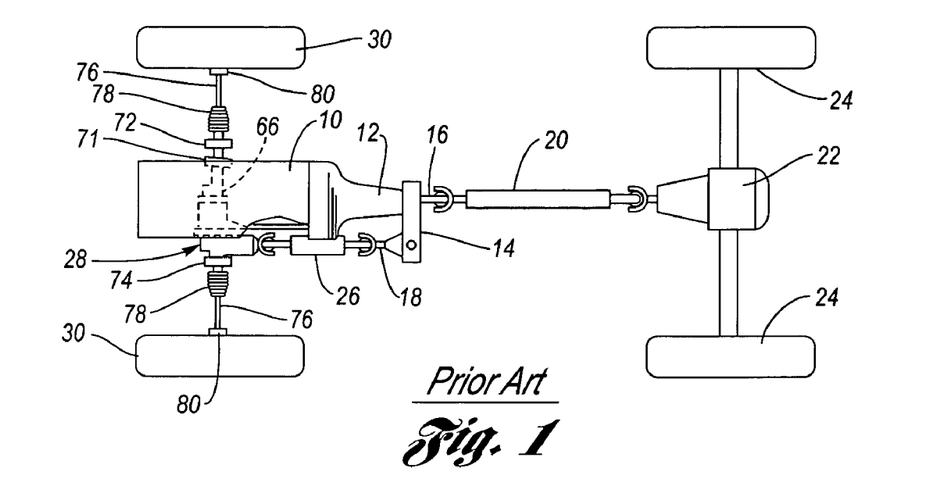
FIG. 1 is a schematic plan view of a part-time four-wheel drive vehicle according to the prior art.

Referring now to FIG. 1, the split axle drive system of U.S. Pat. No. 4,699,235 will be briefly described for point of reference, it being understood the present invention may apply to two wheel drive or four wheel drive systems.

Shown is a schematic plan view of a part-time four-wheel drive vehicle, comprising an internal combustion engine 10, transmission 12 and transfer case 14 mounted on a vehicle chassis (not shown). The engine 10 and transmission 12 are well-known components as is the transfer case 14 which typically has an input shaft (not shown), a main output shaft 16 and an auxiliary output shaft 18. The main output shaft 16 is drive connected to the input shaft in the transfer case 14 and is customarily aligned with it. The auxiliary output shaft 18 is drive connectable to the input shaft by a clutch or the like in the transfer case 14 and customarily offset from it. The transfer case clutch is actuated by a suitable selector mechanism (not shown) which is generally remotely controlled by the vehicle driver.

The main output shaft 16 is drivingly connected to a rear propeller shaft 20 which in turn is drivingly connected to a rear differential 22. The rear differential 22 drives the rear wheels 24 through split axle parts in a well-known manner. The auxiliary output shaft 18 is drivingly connected to a front propeller shaft 26 which in turn is drivingly connected to a split axle drive mechanism 28 for selectively driving the front wheels 30 through split axle parts. The split axle drive mechanism 28 is attached to the vehicle chassis by means including a bracket 71 on an extension tube 66.

Suitable split axle parts, commonly referred to as half shafts, are well-known from front wheel drive automobiles. These may be used for connecting the split axle drive mechanism 28 to the front wheels 30. The drawings schematically illustrate a common type of half shaft for driving connection to independently suspended steerable vehicle wheels comprising an axle shaft 76 having a plunging universal joint 78 at its inboard end adapted for connection to an output such as the flange 72 or 74 and the well-known Rzeppa-type universal joint 80 at its outboard end adapted to be connected to the vehicle wheel 30.

Problematically, axle shafts frequently exhibit "powerhop" when a large amount of torque is applied thereto. Powerhop typically occurs when tire friction with respect to a road surface is periodically exceeded by low frequency (i.e., below about 20 Hz) oscillations in torsional windup of the axle shafts. Powerhop produces oscillatory feedback to suspension and driveline components and can be felt by the vehicle occupants, who may describe the sensation as "bucking," "banging," "kicking" or "hopping."

Axle shafts are typically manufactured from steel bar material and, as such, act as very efficient torsional springs. In the interest of reducing unwanted oscillations in the axle shafts, the standard practice has been to adjust the size (i.e., increasing the diameter) of the axle shafts in order to tune the resonating frequencies in such a way to minimize the negative impact of oscillations by increasing the overall torsional stiffness of the axle shafts, thereby reducing powerhop. However, increasing the diameter of the axle shafts results in additional packaging, mass and cost related problems, while not really addressing the core issue of directly damping oscillations that are associated with powerhop, to wit: lack of damping to absorb energy placed into the driveline by the negative damping characteristics of the tires during hard longitudinal acceleration or deceleration.

Accordingly, there is a clearly felt need in the art for axle shafts which are inherently damped very near the source of the oscillation, and thereby provide reduction of powerhop and associated driveline disturbances, such as for example axle shutter.

SUMMARY OF THE INVENTION

The present invention is an independently suspended, driven axle shaft set in which the axle shafts are asymmetric with respect to each other, wherein the asymmetry provides mitigation of powerhop and associated driveline disturbances, such as for example axle shutter.

According to a preferred form of the present invention, the asymmetric axle shafts are asymmetrically tuned such that the relative torsional stiffness therebetween is different by a ratio substantially between about 1.4 to 1 and about 2.0 to 1. The asymmetry may be provided by any known modality that alters torsional stiffness and is compliant with operational load demands of the axle shafts, as for example the axle shafts having the same length, but differing cross-sectional diameters; by the axle shafts having the same cross-sectional diameters, but differing lengths; by the axle shafts having differing solidity (i.e., being solid versus hollow); by the axles shafts having differing material composition; or a combination thereof.

The asymmetric axle shafts are operably connected to a limited slip differential in order to provide an axle-to-axle friction torque coupling through which out of phase torque oscillation damping between the asymmetric axle shafts occurs. According to a preferred form of the present invention, the asymmetric axle shafts are suspended in a cradle which is, itself, connected to the vehicle frame or body either directly or via a plurality of resilient cradle mounts having a stiffness which is tuned, per a particular application, to maximize the mitigation of powerhop in conjunction with the asymmetry of the axle shafts.

Accordingly, it is an object of the present invention to provide an independently suspended, driven axle shaft set in which the axle shafts are asymmetric with respect to each other, wherein the asymmetry provides mitigation of powerhop and associated driveline disturbances, such as for example axle shutter.

This and additional objects, features and benefits of the present invention will become clearer from the following specification of a preferred embodiment.

DESCRIPTION OF THE PREFERRED EMBODIMENT

Referring now to the Drawings, FIGS. 2 through 12 depict various aspects of independently suspended, driven asymmetric axle shafts 100, 100' according to the present invention.

Figure 2:
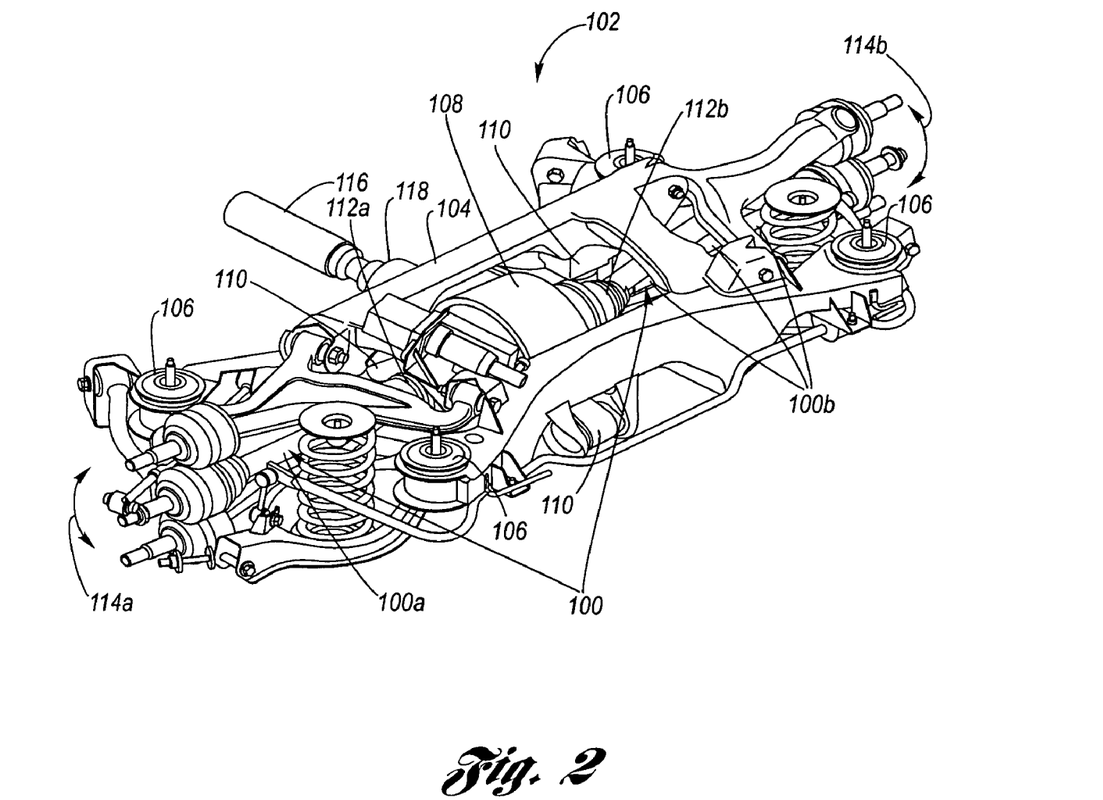
FIG. 2 is a representation of a rear suspension of a vehicle employing asymmetric axle shafts according to the present invention.

FIG. 2 depicts an example of a motor vehicle rear suspension 102 of a motor vehicle drive system which incorporates the asymmetric axle shafts 100. The asymmetric axle shafts 100 are in the form of a set of two mutually asymmetric axle shafts: a first axle shaft 100a and a second axle shaft 100b, wherein the asymmetry therebetween is such that each has a different torsional stiffness with respect to the other. The rear suspension 102 includes a cradle 104 which is attached, in this application, by resilient cradle mounts 106 to a frame (not shown) of the motor vehicle. A rear differential module 108 is connected to the cradle 104 via resilient rear differential module mounts 110, and is further connected, via constant velocity joints 112a, 112b to the first and second axles shafts 100a, 100b, respectively, of the asymmetric axle shafts 100. The first and second axle shafts 100a, 100b are independently suspended via the constant velocity joints 112a, 112b so they are able to independently articulate along arrows 114a, 114b. A propeller shaft 116 is connected at one end to a transmission (not shown) and at its other end, via a constant velocity (or other type of) joint 118, to the rear differential module.

Referring in addition to FIGS. 3 through 12, structural and functional aspects of the asymmetric axles shafts 100, 100' will be detailed.

Figure 3:
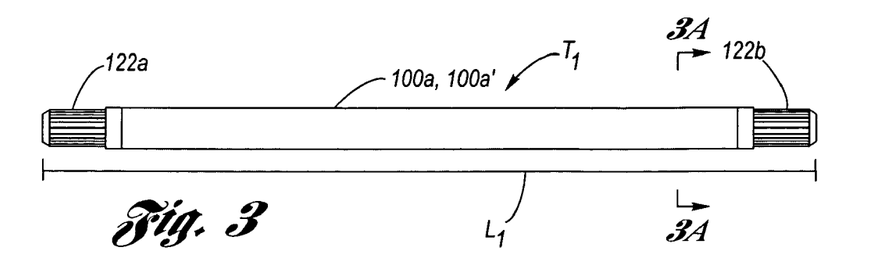
FIG. 3 is a side view of an example of a first asymmetric axle shaft according to the present invention.
Figure 3A:
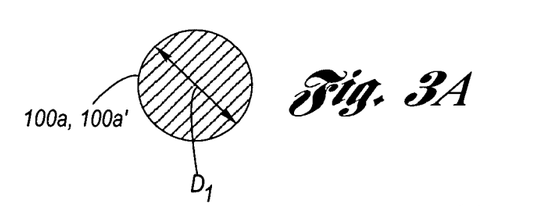
FIG. 3A is a cross-sectional view, seen along line 3A-3A of FIG. 3.

FIGS. 3 and 3A represent a first axle shaft 100a, 100a' in which a length $L_1$ is preselected and a cross-sectional diameter $D_1$ is also preselected. The selection criteria being that generally standard in the art regarding durability and torque load handling. In this regard, the first axle shaft has a selected torsional stiffness $T_1$. By way of example, the first axle shaft 100a' is constructed of solid or hollow steel in a cylindrical configuration, having splines 122a, 122b at each end for engaging constant velocity joints of the independent suspension.

In contradistinction, the second axle shaft 100b is asymmetric with respect to the first axle shaft 100a such that the physical properties thereof provide a different torsional stiffness $T_2$, which may be greater or less than $T_1$, wherein the ratio of the torsional stiffness is between about 1.4 to 1 and about 2.0 to 1. By way of example, the second axle shaft 100b is constructed of solid or hollow steel in a cylindrical configuration, also having splines 122a, 122b at each end for engaging constant velocity joints of the independent suspension.

Figure 4:
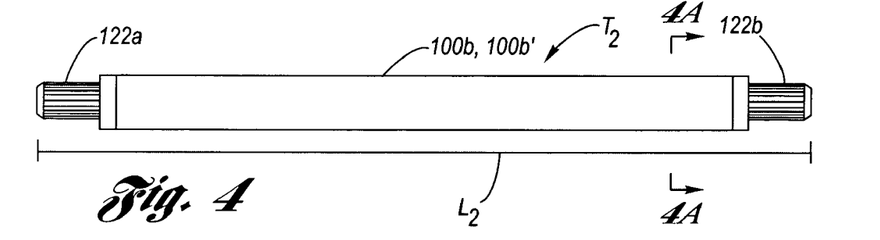
FIG. 4 is a first example of a second asymmetric axle shaft which is asymmetric with respect to FIG. 3.
Figure 4A:
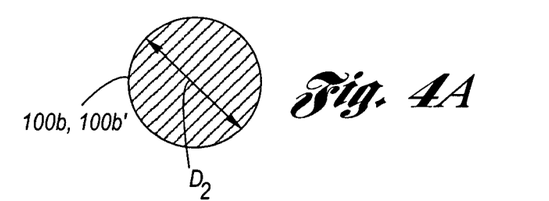
FIG. 4A is a cross-sectional view, seen along line 4A-4A of FIG. 4.
Figures 5, 5A, 5B:
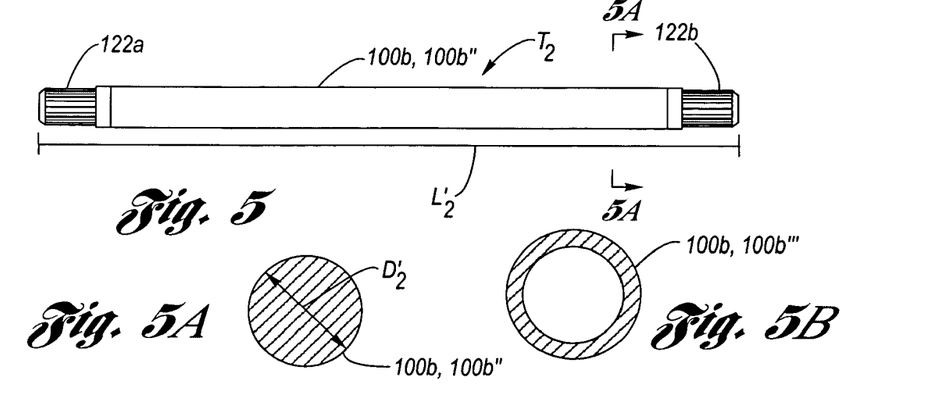
FIG. 5 is a second example of a second asymmetric axle shaft which is asymmetric with respect to FIG. 3.
FIG. 5A is a cross-sectional view, seen along line 5A-5A of FIG. 5.
FIG. 5B is a cross-sectional view of a third example of a second asymmetric axle shaft which is asymmetric with respect to FIG. 3.

Turning attention next to FIGS. 4 through 5B, depicted are examples of how physical differences between the first and second axle shafts 100a, 100b may provide the desired difference in torsional stiffness.

FIGS. 4 and 4A show a first example of a second axle shaft 100b, 100b' in which the length $L_2$ is equal to $L_1$; however, the cross-sectional diameter $D_2$ is different from $D_1$ (the splines 122a, 122b are identical to that of FIG. 3). In the example shown, $D_2 > D_1$, however, it is also equally possible, of course, to make $D_2 < D_1$, all that is required is that $D_1$ be different from $D_2$ such as to provide the desired difference in torsional stiffness in which the ratio is between about 1.4 to 1 and 2.0 to 1.

FIGS. 5 and 5A show a second example of a second axle shaft 100b, 100b" in which the cross-sectional diameter $D_2$' is equal to $D_1$; however, length $L_2$' is different from $L_1$, (the splines 122a, 122b are identical to that of FIG. 3). In the example shown, $L_2' < L_1$, however, it is also equally possible, of course, to make $L_2' > L_1$, all that is required is that $L_1$ be different from $L_2$ such as to provide the desired difference in torsional stiffness in which the ratio is between about 1.4 to 1 and 2.0 to 1.

Of course, it is possible to alter the physical properties in other ways to achieve the torsional stiffness difference as between the first and second axle shafts 100a, 100b, as for example by a selected combination of cross-sectional diameter difference, length difference, solidity difference (i.e., solid vs. hollow construction) or material composition difference (however, since various steels tend to have all about the same torsional stiffness for a given geometry steel materials substitution is unlikely to have, of itself, sufficient difference) . An example of torsional stiffness asymmetry due to solidity difference is shown by comparison between FIGS. 3 and 5B, wherein a third example of a second axle shaft 100b, 100b''' is hollow, and may have a larger or smaller cross-sectional diameter than $D_1$ and a length longer or shorter than $L_1$, whereby the torsional stiffness is different therebetween. As mentioned, either or both of the first and second axle shafts 100a, 100b may be solid or hollow.

The asymmetric axle shafts 100, 100' are operably connected to a limited slip differential, which may be electrical or mechanical, (as for example 108 of FIG. 2 or 306 of FIG. 12) in order to provide an axle-to-axle mechanical coupling through which out of phase torque oscillation damping between the asymmetric axle shafts occurs. The mechanical coupling in a limited slip differential provides a friction torque coupling between the asymmetric axle shafts, wherein, as for example by empirical testing or mathematical modeling, an optimum friction torque is provided that is optimal for a given difference in torsional stiffness between the asymmetric axle shafts, per a particular application. In this regard, if there is no friction torque coupling between the asymmetric axle shafts, then the asymmetry of the axle shafts is unable to provide damping by out of phase torque oscillations axle-to-axle; on the other hand, if an open differential is used instead of a limited slip differential or if the coupling has no slip between the asymmetric axle shafts, then the torque oscillations therebetween will tend to be in phase, and damping will be mitigated, that is, lessened.

Figure 6:
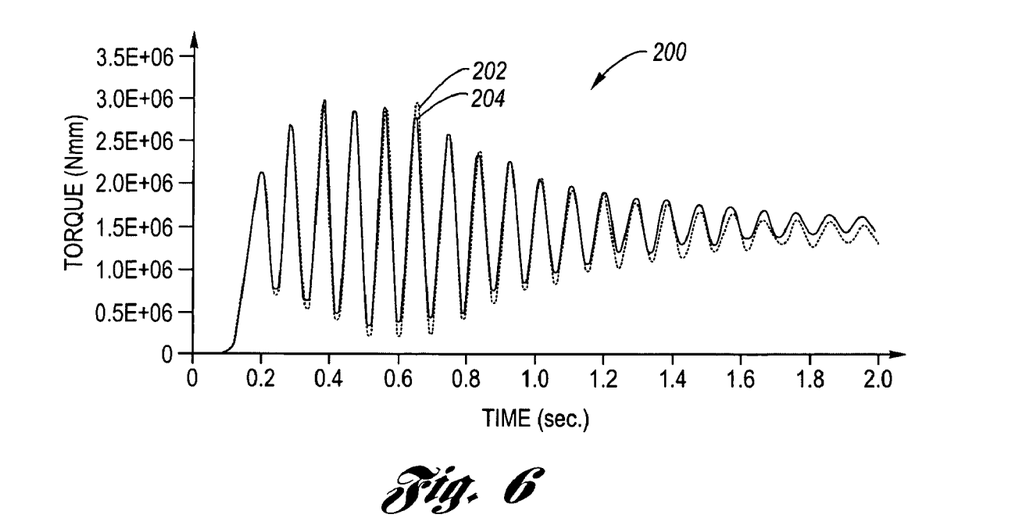
FIG. 6 is a graph of axle shaft torque versus time of a symmetric axle shaft set according to the prior art.

FIG. 6 is a graph 200 of axle shaft torque versus time for conventional symmetric axle shafts, wherein plots 202, 204 are respectively for each axle shaft, and wherein each axle shaft has a torsional stiffness of 525 Nm/deg. (i.e., Newton meters per degree). It will be seen that torque oscillations are in phase, whereby the conditions for powerhop are not mitigated in that the torque oscillations of each axle shaft are constructive with respect to each other.

Figure 7:
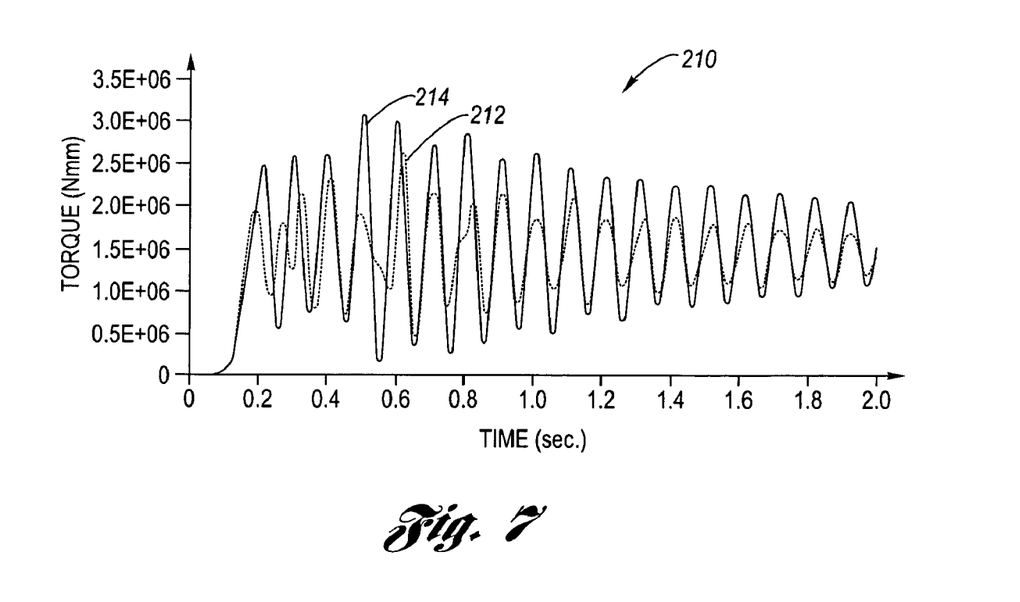
FIG. 7 is a graph of torque versus time of an asymmetric axle shaft set according to the present invention.

FIG. 7 is a graph 210 of axle shaft torque versus time for asymmetric axle shafts 100 according to the present invention, wherein plot 212 is for the first axle shaft 100a which has a torsional stiffness of 270 Nm/deg. and wherein plot 214 is for the second axle shaft 100b which has a torsional stiffness of 525 Nm/deg. It will be seen that, unlike FIG. 6, torque oscillations are out of phase, whereby the conditions for powerhop are mitigated in that the torque oscillations of each axle shaft are destructive with respect to each other (the out of phase torque oscillations being most pronounced during an initial portion of a powerhop event when powerhop is most likely to be felt by passengers of the vehicle).

Figure 8:
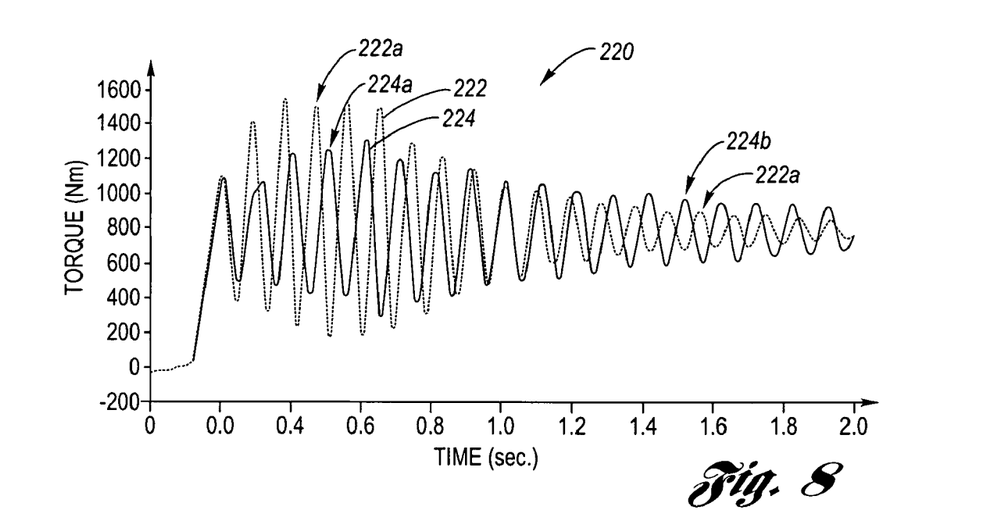
FIG. 8 is a graph of propeller shaft torque versus time comparing symmetric and asymmetric axle shaft sets.

FIG. 8 is a graph 220 of propeller shaft (see 116 of FIG. 2) torque versus time for conventional symmetric axle shafts at plot 222, wherein each axle shaft has a torsional stiffness of 525 Nm/deg., wherein the propeller shaft has a torsional stiffness of 138 Nm/deg. and wherein cradle mount (see 106 of FIG. 2) damping is 2 Nsec/mm; and for asymmetric axle shafts 100 according to the present invention at plot 224, wherein the first axle shaft 100a has a torsional stiffness of 270 Nm/deg. and the second axle shaft 100b which has a torsional stiffness of 525 Nm/deg., wherein the propeller shaft has a torsional stiffness of 138 Nm/deg. and wherein cradle mount damping is 2 Nsec/mm with an electronic limited slip differential having a friction torque of 400 Nm. It will be seen that the amplitudes of the torque oscillations in initial plot portion 222a are high, which is interpreted to mean powerhop is of sufficient amplitude that it may be felt by passengers. On the other hand, initial plot portion 224a has lower amplitude torque oscillations than initial plot portion 222a, which is interpreted to mean powerhop is not of sufficient amplitude that it may be felt by passengers. The fact that following plot portion 224b of plot 224 has a residual amplitude larger than that of following plot portion 222b of plot 222 is of vanishing consequence, since the amplitudes of these torque oscillations will not be felt by passengers of the vehicle.

Figure 9:
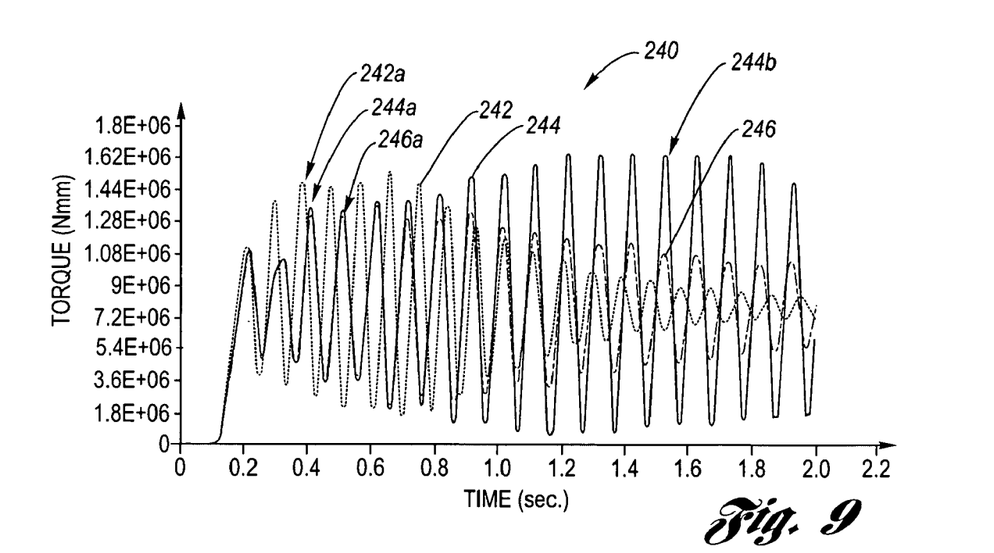
FIG. 9 is a graph of propeller shaft torque versus time comparing a symmetric axle shaft set with highly damped cradle mounts, an asymmetric axle shaft set with minimally damped cradle mounts, and an asymmetric axle shaft set with highly damped cradle mounts.

FIG. 9 is a graph 240 of propeller shaft torque versus time for conventional symmetric axle shafts at plot 242, wherein each axle shaft has a torsional stiffness of 525 Nm/deg., wherein the propeller shaft has a torsional stiffness of 138 Nm/deg. and wherein cradle mount damping is high at about 2 Nsec/mm.; for asymmetric axle shafts 100 according to the present invention at plot 244, wherein the first axle shaft 100a has a torsional stiffness of 270 Nm/deg. and the second axle shaft 100b which has a torsional stiffness of 525 Nm/deg., wherein the propeller shaft has a torsional stiffness of 138 Nm/deg. and wherein cradle mount damping is minimal around 0.2 Nsec/mm at around 10 Hz; and for asymmetric axle shafts 100 according to the present invention at plot 246, wherein the first axle shaft 100a has a torsional stiffness of 270 Nm/deg. and the second axle shaft 100b which has a torsional stiffness of 525 Nm/deg., wherein the propeller shaft has a torsional stiffness of 138 Nm/deg. and wherein cradle mount damping is high at about 2 Nsec/mm. It will be seen that the amplitudes of the torque oscillations in plot portion 242a of plot 242 are high, which is interpreted to mean powerhop is of sufficient amplitude that it may be felt by passengers, while that of initial plot portion 244a of plot 244 and initial plot portion 246a of plot 246 have amplitudes of the respective torque oscillations are low enough that passengers would not feel powerhop. What is seen further, however, is that while initial plot portion 244a has relatively low torque oscillation amplitude, that for following plot portion 244b, the torque oscillation amplitude increases to a level which may be felt by passengers. On the other hand, plot 246 everywhere has low torque oscillation amplitudes, which is interpreted to mean that powerhop would not be felt by passengers. Accordingly, depending upon the application, it may be desirable to include high damped cradle mounts with the asymmetric axle shafts 100; however, it is to be noted that there are applications that will not utilize cradle mounts, yet the asymmetric axle shafts damping will still be provided.

Figure 10:
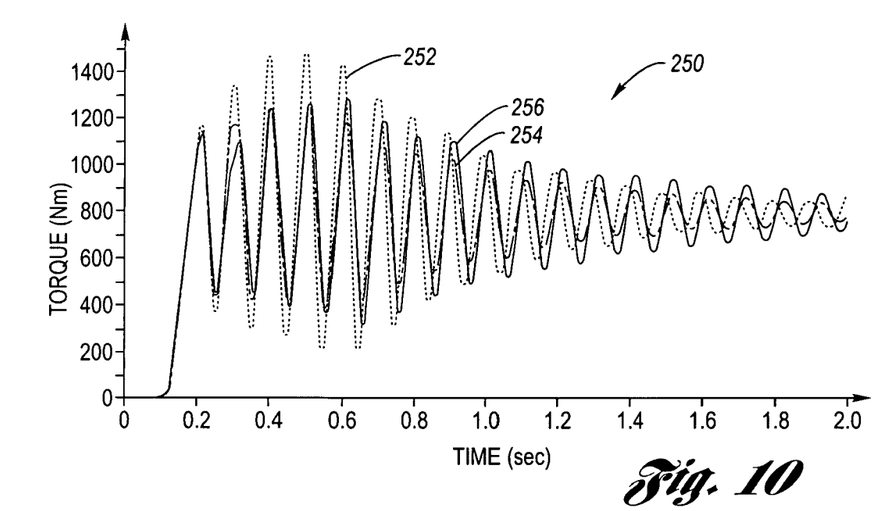
FIG. 10 is a graph of torque versus time of an asymmetric axle shaft set for various values of limited slip differential friction torque.

An illustration of the effect of limited slip differential friction torque is shown at FIG. 10, which is a graph 250 of axle shaft torque versus time for asymmetric axle shafts 100 according to the present invention. In this illustration, the first axle shaft 100a has a torsional stiffness of 270 Nm/deg. and the second axle shaft 100b which has a torsional stiffness of 525 Nm/deg., wherein the propeller shaft has a torsional stiffness of 138 Nm/deg. and wherein cradle mount damping is 2 Nsec/mm. It will be seen that a friction torque of 100 Nm, per plot 252, may be too low, a friction torque of 400 Nm may be optimum, per plot 254, and a friction torque of 2,000 Nm, per plot 256, may be too high.

Figure 11A:
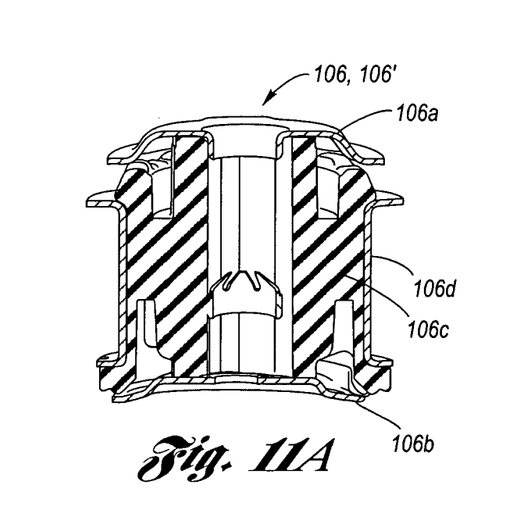
FIG. 11A is a cross-sectional view of a rear cradle mount.
Figure 11B:
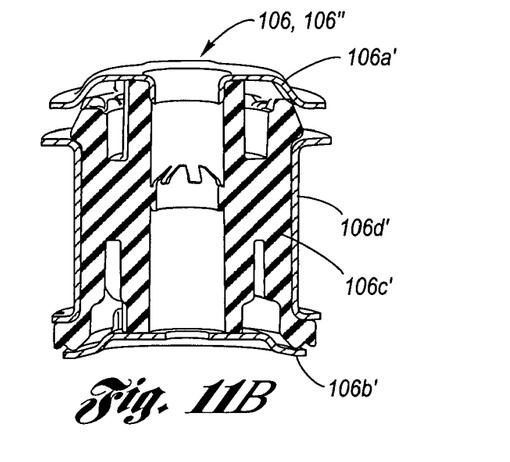
FIG. 11B is a cross-sectional view of a front cradle mount.

In the event resilient cradle mounts 106 are used, the stiffness of the cradle mounts is adjusted by the configuration and choice of rubber. By way of exemplification, resilient cradle mounts are depicted at FIGS. 11A and 11B, wherein FIG. 11A depicts a rear cradle mount 106', and FIG. 11B depicts a front cradle mount 106". Each cradle mount 106', 106" is composed, respectively, of an upper metal washer 106a, 106a', a lower metal washer 106b, 106b', a rubber core 106c, 106c' and an outer sleeve 106d, 106d'.

Figure 12:
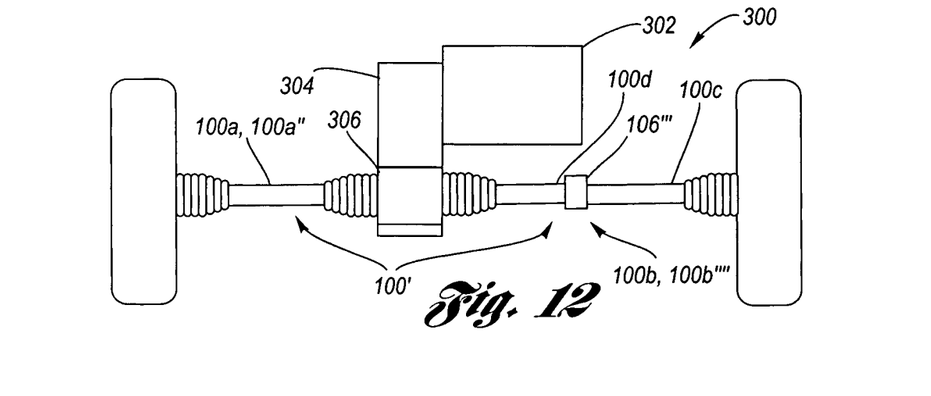
FIG. 12 is a schematic view of a front wheel drive system with one of the asymmetric axle shafts including a jackshaft.

FIG. 12 is a schematic depiction of a front wheel drive system 300, including an engine 302, a transmission 304, a limited slip differential 306 and asymmetric axle shafts 100'. The first axle shaft 100a, 100a" is, for example, as depicted at FIG. 3. The second axle shaft 100b, 100b"" is a combination of a second axle shaft component 100c and a jackshaft component 100d drivingly connected thereto, by way of example at a cradle mount 106'". It will be understood that the asymmetry as between the first and second axle shafts includes the physical properties (i.e., length, cross-sectional diameter, solidity, composition, etc.) of the first axle shaft 100a, 100a"

with respect to the second axle shaft 100*b*, 100*b*"" per each or both of the second axle shaft component 100*c* and the jackshaft component 100*d*.

By way of exemplification and not limitation, the following example is given merely for referential purposes.

EXAMPLE 1

Asymmetric axle shafts have the first axle shaft 100*a* with a torsional stiffness of 270 Nm/deg. (right hand axle shaft having a diameter of 35 mm between the splines, a length of 0.6 meters, and composed of solid 300M type steel) and have the second axle shaft 100*b* with a torsional stiffness of 525 Nm/deg. (left hand axle shaft having a diameter of 55 mm between the splines, a length of 0.52 meters composed of hollow 300M type steel with an 8 mm wall thickness); the propeller shaft has a torsional stiffness of 138 Nm/deg.; the friction torque of the limited slip differential is 400 Nm; and the cradle mounts have a vertical damping of 2 Nsec/mm.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A method of mitigating powerhop in an independently suspended driven axle shaft set, comprising the steps of:
    selecting a torsional stiffness difference between a first torsional stiffness of a first axle shaft of the axle shaft set and a second torsional stiffness of a second axle shaft of the axle shaft set, wherein the torsional stiffness difference is defined by a ratio between said first torsional stiffness and said second torsional stiffness, and wherein the ratio is greater than about 1.4 to 1 and less than about 2.0 to 1;
    selecting a friction torque of a mutual coupling of the first and second axle shafts responsive to the ratio, wherein the mutual coupling friction torque couples the first axle shaft to the second axle shaft, the selecting of a friction torque selects a friction torque substantially between about 100 Nm and about 2,000 Nm such that in combination with the selected torsional stiffness difference: a) torque oscillations as a function of time are generally out of phase with respect to the first and second axle shafts, and b) the out of phase torque oscillations between the first and second axle shafts are damped through the friction torque coupling;
    providing the first axle shaft having the determined first torsional stiffness;
    providing the second axle shaft having the determined second torsional stiffness; and
    axle-to-axle friction torque coupling the first and second axle shafts such that the first and second axle shafts are friction torque coupled with the selected friction torque.

2. The method of claim 1, wherein said step of axle to axle friction torque coupling comprises:
    providing the axle-to-axle friction torque coupling using a limited slip differential having the selected friction torque; and
    drivingly connecting the first and second axle shafts to the limited slip differential.

3. The method of claim 2, wherein said step of selecting a friction torque selects about 400 Nm.

* * * * *